United States Patent
Wu et al.

(10) Patent No.: US 10,156,842 B2
(45) Date of Patent: Dec. 18, 2018

(54) DEVICE ENROLLMENT IN A CLOUD SERVICE USING AN AUTHENTICATED APPLICATION

(71) Applicant: General Electric Company, Schenectady, NY (US)

(72) Inventors: Jiaqi Wu, San Ramon, CA (US); Greg Lammers, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 24 days.

(21) Appl. No.: 15/094,737

(22) Filed: Apr. 8, 2016

(65) Prior Publication Data

US 2017/0195332 A1    Jul. 6, 2017

Related U.S. Application Data

(60) Provisional application No. 62/273,782, filed on Dec. 31, 2015.

(51) Int. Cl.
*G06F 7/04*      (2006.01)
*G05B 19/418*    (2006.01)
(Continued)

(52) U.S. Cl.
CPC ..... *G05B 19/41885* (2013.01); *G06F 3/0482* (2013.01); *G06F 3/04842* (2013.01);
(Continued)

(58) Field of Classification Search
CPC .... G05B 19/41885; G05B 2219/23005; G05B 2219/33139; G06F 3/0482; G06F 3/04842;
(Continued)

(56) References Cited

U.S. PATENT DOCUMENTS 4,468,559 A    8/1984 Hurst
4,764,927 A    8/1988 Izumita
(Continued)

FOREIGN PATENT DOCUMENTS

EP    2801936    11/2014
WO    2015108536    7/2015

OTHER PUBLICATIONS

"The Essential OAuth Primer: Understanding OAuth for Securing Cloud APIs", Ping Identity, [online]. Retrieved from the Internet: <URL: https://www.pingidentity.com/en/resources/white-papers/oauth-primer.html, (2015), 1-10.

(Continued)

*Primary Examiner* — Techane Gergiso
(74) *Attorney, Agent, or Firm* — Fitch, Even, Tabin & Flannery LLP

(57) ABSTRACT

In various example embodiments, systems and methods for administering machine access to a cloud service are presented. An edge manager device in a cloud computing environment can establish a first client for a first application that is executed externally to the cloud computing environment. The edge manager device can provide a first request via a first network to an authorization service application to obtain client identification and client secret information for use by the first client. The edge manager device can receive the client identification and client secret information from the authorization service application via the first network. The client identification and client secret information can be selected by the authorization service application to permit later data access to the edge manager device by the first client. The edge manager device can provide the client identification and client secret information to the first client via a second network.

20 Claims, 10 Drawing Sheets

(51) Int. Cl.

| | |
|---|---|
| *H04L 29/06* | (2006.01) |
| *H04L 29/08* | (2006.01) |
| *G06F 3/0482* | (2013.01) |
| *G06F 3/0484* | (2013.01) |
| *G06F 3/0488* | (2013.01) |
| *H04L 12/24* | (2006.01) |
| *H04L 12/26* | (2006.01) |
| *G06Q 10/04* | (2012.01) |
| *G06Q 10/06* | (2012.01) |

(52) U.S. Cl.
CPC ...... *G06F 3/04845* (2013.01); *G06F 3/04847* (2013.01); *G06F 3/04883* (2013.01); *G06Q 10/04* (2013.01); *G06Q 10/06* (2013.01); *H04L 41/12* (2013.01); *H04L 43/045* (2013.01); *H04L 63/0823* (2013.01); *H04L 63/0876* (2013.01); *H04L 63/10* (2013.01); *H04L 63/18* (2013.01); *H04L 67/10* (2013.01); *G05B 2219/23005* (2013.01); *G05B 2219/33139* (2013.01); *G06F 2203/04806* (2013.01)

(58) Field of Classification Search
CPC ............. G06F 3/04845; G06F 3/04847; G06F 3/04883; G06Q 10/04; G06Q 10/06; H04L 41/12; H04L 43/045; H04L 63/0823; H04L 63/0876; H04L 63/10; H04L 63/18; H04L 67/10
See application file for complete search history.

(56) References Cited

U.S. PATENT DOCUMENTS

| | | | |
|---|---|---|---|
| 4,816,806 A | 3/1989 | Ohishi | |
| 4,943,965 A | 7/1990 | Machida | |
| 4,954,761 A | 9/1990 | Kimura | |
| 5,227,682 A | 7/1993 | Nakabayashi | |
| 5,227,770 A | 7/1993 | Freeman | |
| 5,291,483 A | 3/1994 | Nagai | |
| 5,674,381 A | 10/1997 | Den Dekker | |
| 5,691,980 A | 11/1997 | Welles, II | |
| 5,714,972 A | 2/1998 | Tanaka | |
| 5,781,494 A | 7/1998 | Bae | |
| 5,841,687 A | 11/1998 | Rees | |
| 5,841,783 A | 11/1998 | Suzuki | |
| 5,963,484 A | 10/1999 | Jung | |
| 5,999,482 A | 12/1999 | Kornachuk | |
| 6,084,169 A | 7/2000 | Hasegawa | |
| 6,147,774 A | 11/2000 | Hamadani | |
| 6,177,862 B1 | 1/2001 | Sakata | |
| 6,268,853 B1 | 7/2001 | Hoskins | |
| 6,292,830 B1 | 9/2001 | Taylor | |
| 6,304,531 B1 | 10/2001 | Koudo | |
| 6,353,703 B1 | 3/2002 | Tatsumi | |
| 6,391,996 B1 | 5/2002 | Scherer | |
| 6,405,132 B1 | 6/2002 | Breed | |
| 6,421,571 B1 | 7/2002 | Spriggs | |
| 6,654,886 B1 | 11/2003 | Challener | |
| 6,789,030 B1 | 9/2004 | Coyle | |
| 7,050,873 B1 | 5/2006 | Discenzo | |
| 7,165,040 B2 | 1/2007 | Ehrman | |
| 7,209,921 B2 | 4/2007 | Pace | |
| 7,213,036 B2 | 5/2007 | Apparao | |
| 7,307,526 B2 | 12/2007 | Rajapakse | |
| 7,313,403 B2 | 12/2007 | Gong | |
| 7,313,465 B1 | 12/2007 | O'Donnell | |
| 7,382,264 B2 | 6/2008 | Rajapakse | |
| 7,395,275 B1 | 7/2008 | Parent | |
| 7,421,081 B2 | 9/2008 | Zhang | |
| 7,487,551 B2 | 2/2009 | Carpentier | |
| 7,506,157 B2 | 3/2009 | Carpentier | |
| 7,512,675 B2 | 3/2009 | Sandaire | |
| 7,516,110 B2 | 4/2009 | Spector | |
| 7,530,115 B2 | 5/2009 | Carpentier | |
| 7,558,564 B2 | 7/2009 | Wesby | |
| 7,561,884 B2 | 7/2009 | Hamilla | |
| 7,574,103 B2 | 8/2009 | Green | |
| 7,580,946 B2 | 8/2009 | Mansour | |
| 7,580,986 B2 | 8/2009 | Bugaj | |
| 7,600,123 B2 | 10/2009 | Parupudi | |
| 7,649,912 B2 | 1/2010 | Balasubramanian | |
| 7,672,957 B2 | 3/2010 | Cotichini | |
| 7,689,501 B1 | 3/2010 | Gastineau | |
| 7,699,706 B2 | 4/2010 | Walker | |
| 7,708,635 B2 | 5/2010 | Walker | |
| 7,711,623 B2 | 5/2010 | Smith | |
| 7,746,838 B2 | 6/2010 | Twitchell, Jr. | |
| 7,747,603 B2 | 6/2010 | Apparao | |
| 7,782,226 B2 | 8/2010 | Sendrowicz | |
| 7,793,112 B2 | 9/2010 | Carpentier | |
| 7,805,606 B2 | 9/2010 | Birger | |
| 7,806,761 B2 | 10/2010 | Walker | |
| 7,824,258 B2 | 11/2010 | Walker | |
| 7,836,055 B2 | 11/2010 | MacMahon | |
| 7,840,534 B2 | 11/2010 | Weber | |
| 7,882,025 B1 | 2/2011 | Seal | |
| 7,926,087 B1 | 4/2011 | Holl, II | |
| 7,937,412 B2 | 5/2011 | Apparao | |
| 7,979,376 B2 | 7/2011 | Shepherd | |
| 8,026,910 B2 | 9/2011 | Elmieh | |
| 8,038,523 B2 | 10/2011 | Walker | |
| 8,043,152 B2 | 10/2011 | Walker | |
| 8,047,908 B2 | 11/2011 | Walker | |
| 8,111,651 B2 | 2/2012 | Twitchell, Jr. | |
| 8,150,892 B2 | 4/2012 | Apparao | |
| 8,176,061 B2 | 5/2012 | Swanbeck | |
| 8,230,387 B2 | 7/2012 | Srivastava | |
| 8,326,749 B1 | 12/2012 | Seal | |
| 8,341,155 B2 | 12/2012 | Lane | |
| 8,353,757 B2 | 1/2013 | Walker | |
| 8,368,559 B2 | 2/2013 | Pixley | |
| 8,386,525 B2 | 2/2013 | Pace | |
| 8,449,368 B2 | 5/2013 | Walker | |
| 8,458,142 B2 | 6/2013 | Pace | |
| 8,495,025 B2 | 7/2013 | Newson | |
| 8,532,967 B2 | 9/2013 | Torrens | |
| 8,605,660 B2 | 12/2013 | Twitchell, Jr. | |
| 8,615,789 B2 | 12/2013 | Arasaratnam | |
| 8,621,637 B2 | 12/2013 | Al-Harbi | |
| 8,624,898 B1 | 1/2014 | Bugaj | |
| 8,633,853 B2 | 1/2014 | Amidi | |
| 8,645,904 B2 | 2/2014 | Coldicott | |
| 8,654,120 B2 | 2/2014 | Beaver, III | |
| 8,659,392 B2 | 2/2014 | Sheikman | |
| 8,660,930 B2 | 2/2014 | Michael | |
| 8,736,612 B1 | 5/2014 | Goldman | |
| 8,751,487 B2 | 6/2014 | Byrne | |
| 8,762,555 B1 | 6/2014 | Peterson | |
| 8,762,945 B2 | 6/2014 | Arnold | |
| 8,768,777 B2 | 7/2014 | Lin | |
| 8,769,493 B2 | 7/2014 | Arnold | |
| 8,776,203 B2 | 7/2014 | Ajitomi | |
| 8,784,175 B2 | 7/2014 | Walker | |
| 8,843,636 B1 * | 9/2014 | Wu | H04L 69/04 709/226 |
| 8,972,071 B2 | 3/2015 | Meyerhofer et al. | |
| 8,972,484 B2 | 3/2015 | Naphade et al. | |
| 9,015,073 B2 | 4/2015 | Mirra | |
| 9,087,361 B2 | 7/2015 | Mirra | |
| 9,100,390 B1 | 8/2015 | Asnis et al. | |
| 9,105,062 B2 | 8/2015 | Posch | |
| 9,105,064 B2 | 8/2015 | Posch | |
| 9,215,556 B2 | 12/2015 | Sheikman | |
| 9,218,230 B2 | 12/2015 | Kiessling | |
| 9,306,949 B1 * | 4/2016 | Richard | H04L 63/0272 |
| 9,338,058 B2 | 5/2016 | Gidlund | |
| 9,413,609 B2 | 8/2016 | Kiessling | |
| 9,454,744 B2 | 9/2016 | Imming | |
| 9,513,648 B2 | 12/2016 | Forbes, Jr. | |
| 9,537,884 B1 | 1/2017 | Raugas | |
| 9,614,963 B2 | 4/2017 | Maturana | |
| 9,665,433 B2 | 5/2017 | Grewal | |

(56) References Cited

U.S. PATENT DOCUMENTS

| | | |
|---|---|---|
| 9,673,995 B2 | 6/2017 | Angst |
| 9,760,544 B2 | 9/2017 | Mirra |
| 9,784,599 B1 | 10/2017 | Close |
| 9,833,683 B2 | 12/2017 | Thurman |
| 9,847,990 B1 | 12/2017 | De Boursetty |
| 2002/0116281 A1 | 8/2002 | Costello |
| 2003/0023518 A1 | 1/2003 | Spriggs |
| 2003/0078958 A1 | 4/2003 | Pace |
| 2003/0225707 A1 | 12/2003 | Ehrman |
| 2004/0163044 A1 | 8/2004 | Nakano |
| 2005/0258241 A1 | 11/2005 | McNutt |
| 2006/0010032 A1 | 1/2006 | Eicher |
| 2006/0072505 A1 | 4/2006 | Carrillo |
| 2006/0089895 A1 | 4/2006 | Joye |
| 2006/0101507 A1 | 5/2006 | Camenisch |
| 2006/0245454 A1 | 11/2006 | Balasubramanian |
| 2007/0179832 A1 | 8/2007 | Reich |
| 2007/0288745 A1 | 12/2007 | Kwan |
| 2008/0027704 A1 | 1/2008 | Kephart et al. |
| 2008/0066053 A1 | 3/2008 | Ramamoorthy |
| 2008/0215474 A1 | 9/2008 | Graham |
| 2008/0228346 A1 | 9/2008 | Lucas |
| 2008/0294387 A1 | 11/2008 | Anderson et al. |
| 2009/0030952 A1 | 1/2009 | Donahue |
| 2009/0109225 A1 | 4/2009 | Srivastava |
| 2009/0204267 A1 | 8/2009 | Sustaeta |
| 2009/0210081 A1 | 8/2009 | Sustaeta |
| 2010/0030618 A1 | 2/2010 | Green |
| 2010/0144383 A1 | 6/2010 | Berger |
| 2010/0150122 A1 | 6/2010 | Berger |
| 2010/0153282 A1 | 6/2010 | Graham |
| 2010/0299138 A1 | 11/2010 | Kim |
| 2011/0050461 A1 | 3/2011 | Pixley |
| 2011/0277003 A1 | 11/2011 | Xiong |
| 2011/0277034 A1 | 11/2011 | Hanson |
| 2012/0180133 A1 | 7/2012 | Al-Harbi |
| 2012/0209733 A1 | 8/2012 | Pelegero |
| 2012/0296482 A1 | 11/2012 | Steven |
| 2013/0060351 A1 | 3/2013 | Imming |
| 2013/0072153 A1 | 3/2013 | Lawson |
| 2013/0073105 A1 | 3/2013 | Schmid et al. |
| 2013/0211559 A1 | 8/2013 | Lawson et al. |
| 2013/0212248 A1 | 8/2013 | Neafsey et al. |
| 2013/0219461 A1 | 8/2013 | Esaki |
| 2013/0231146 A1 | 9/2013 | Mathias |
| 2013/0290374 A1 | 10/2013 | Chand |
| 2013/0332387 A1 | 12/2013 | Mirra |
| 2013/0347075 A1 | 12/2013 | Narendra et al. |
| 2014/0025833 A1 | 1/2014 | Kiessling |
| 2014/0039699 A1 | 2/2014 | Forbes, Jr. |
| 2014/0040657 A1 | 2/2014 | Kiessling |
| 2014/0047532 A1 | 2/2014 | Sowatskey |
| 2014/0095874 A1* | 4/2014 | Desai .................. H04L 63/0815 713/168 |
| 2014/0101434 A1 | 4/2014 | Senthurpandi et al. |
| 2014/0162690 A1 | 6/2014 | Sheikman |
| 2014/0220951 A1 | 8/2014 | Gumbrell |
| 2014/0277795 A1 | 9/2014 | Matsuoka et al. |
| 2014/0303935 A1 | 10/2014 | Kamel et al. |
| 2014/0337429 A1 | 11/2014 | Asenjo et al. |
| 2014/0372617 A1 | 12/2014 | Houyou |
| 2015/0049639 A1 | 2/2015 | Angst |
| 2015/0105172 A1 | 4/2015 | Thurman |
| 2015/0105173 A1 | 4/2015 | Thurman |
| 2015/0120359 A1 | 4/2015 | Dongieux |
| 2015/0128293 A1* | 5/2015 | Hitomi ..................... H04L 65/60 726/29 |
| 2015/0134733 A1 | 5/2015 | Maturana et al. |
| 2015/0149134 A1 | 5/2015 | Mehta et al. |
| 2015/0156070 A1 | 6/2015 | Gidlund |
| 2015/0201223 A1* | 7/2015 | Osorio ............... H04N 21/2183 725/82 |
| 2015/0281453 A1 | 10/2015 | Maturana et al. |
| 2015/0294346 A1 | 10/2015 | Di Giorgio |
| 2015/0381756 A1* | 12/2015 | Lotfallah ............ H04L 67/2814 709/213 |
| 2016/0013948 A1 | 1/2016 | Moses |
| 2016/0044035 A1* | 2/2016 | Huang ................ H04L 63/0272 726/4 |
| 2016/0087955 A1 | 3/2016 | Mohamad Abdul et al. |
| 2016/0088092 A1* | 3/2016 | Cardona-Gonzalez ..................... H04L 67/141 709/227 |
| 2016/0127254 A1* | 5/2016 | Kumar .................... H04L 47/70 709/226 |
| 2016/0269999 A1 | 9/2016 | Hwang |
| 2016/0275629 A1 | 9/2016 | Markey |
| 2017/0010787 A1 | 1/2017 | Ranganathan |
| 2017/0046134 A1* | 2/2017 | Straub ....................... G06F 8/36 |
| 2017/0171204 A1 | 6/2017 | Forood |
| 2017/0192414 A1 | 7/2017 | Mukkamala et al. |
| 2017/0192628 A1 | 7/2017 | O'Connor |
| 2017/0195331 A1 | 7/2017 | Wu et al. |
| 2017/0220334 A1 | 8/2017 | Hart |
| 2017/0221011 A1 | 8/2017 | Von Sichart |
| 2017/0222999 A1 | 8/2017 | Banga |
| 2017/0242555 A1 | 8/2017 | Wragg |
| 2017/0242935 A1 | 8/2017 | Wragg |
| 2017/0255373 A1 | 9/2017 | Bruno |
| 2017/0295057 A1 | 10/2017 | Dost |
| 2017/0302511 A1 | 10/2017 | Foster |
| 2017/0310690 A1 | 10/2017 | Mestha |
| 2017/0359222 A1 | 12/2017 | Dutta |
| 2017/0359366 A1 | 12/2017 | Bushey |
| 2017/0366625 A1 | 12/2017 | Lau |

OTHER PUBLICATIONS

Hardt, D., "The OAuth 2.0 Authorization Framework", [online]. Retrieved from the Internet: <URL: https://tools.ietf.org/html/rfc6749, (Oct. 2012), 152 pgs.

Pandit, Puneel, "Scaling machine data analytics for the Internet of Things—introducing Glassbar SCALAR", [online]. © 2016 Glassbeam, Inc., [Retrieved on Jan. 14, 2016]. Retrieved from the Internet: <URL: http://www.glassbeam.com/scaling-machine-data-analytics-for-the-internet-of-things-introducing-glassbeam-scalar/ >, (Oct. 21, 2013), 2 pgs.

"A cloud purpose-built for industrial big data and analytics", GE Digital, (2015), 11 pgs.

"International Application Serial No. PCT/US2016/069111, International Search Report and Written Opinion dated Feb. 22, 2017", 10 pgs.

"U.S. Appl. No. 15/094,722, Response filed Jan. 19, 2018 to Restriction Requirement dated Dec. 8, 2017", 9 pgs.

"U.S. Appl. No. 15/094,722, Restriction Requirement dated Dec. 8, 2017", 10 pgs.

"Predix Architecture and Services", Technical White Paper, © General Electric Company, (Sep. 2015), 30 pgs.

"Predix™—The software platform for the industrial internet", (video submitted on diskette), (Jan. 15, 2016).

Ascorti, Leonardo, et al., "Cloud-based WirelessHART networking for Critical Industrial Monitoring and Control," 12th IEEE nternational Conference on Industrial Informatics (INDIN), pp. 362-369 (Jul. 27-30, 2014).

Bharadi, Vinayak A., et al., "Online Signature Recognition Using Software as a Service (SaaS) Model on Public Cloud," International Conference on Computing Communication Control and Automation (ICCUBEA), pp. 65-72 (Feb. 26-27, 2015).

Bommagani, A.S., et al., "A Framework for Secure Cloud-Empowered Mobile Biometrics," IEEE Military Communications Conference, pp. 255-261, (Oct. 6-8, 2014) (Abstract).

Huang, D.J., et al., "Clock Skew Based Client Device Identification in Cloud Environments," IEEE 26th International Conference on Advanced Information Networking and Applications, pp. 526-533 (Mar. 26-29, 2012) (Abstract).

Winkler, Steven, et al., "Systems and Methods For Managing Industrial Assets." GE Co-Pending U.S. App. No. 62/273,782, filed Dec. 31, 2015.

(56) References Cited

OTHER PUBLICATIONS

Notice of Allowance and Fees(s) Due, U.S. Appl. No. 15/094,722, dated May 7, 2018, 10 pages.

Tao, Fei, et al. "CCIoT-CMfg: cloud computing and internet of things-based cloud manufacturing service system." IEEE Transactions on Industrial Informatics 10.2 (2014): 1435-1442.

Alamri, Atif, et al., "A Survey on Sensor-Cloud: Architecture, Applications, and Approaches." International Journal of Distributed Senor Networks, 2013, 18 pages.

Betchov, Robert. "Stability of Parallel Flows." Academic Press, Dec. 2012, Introduction, pp. 1-5.

Chen, Min, "Big Data: A Survey." Mobile Networks and Applications, Apr. 2014, vol. 19, issue 2, pp. 171-209, Abstract.

Chen, Min, et al., "Big Data: Related Technologies, Challenges and Future Prospects." SpringerBriefs in Computer Science, 2014, Preface and Chapter 2 (pp. 11-18).

Cooper, Alan. "The Inmates Are Running the Asylum: Why High-Tech Products Drive Us Crazy and How to Restore the Sanity." Feb. 24, 2004, Sams Publishing, 193 pages.

Examiner's Search Strategy and Results, U.S. Appl. No. 15/151,206, dated Jan. 9, 2018, 1 page.

Examiner's Search Strategy and Results, U.S. Appl. No. 15/394,462, dated Apr. 4, 2018, 1 page.

Examiner's Search Strategy and Results, U.S. Appl. No. 15/394,462, dated Jun. 1, 2018, 8 pages.

Gigerenzer, Gerd, "Rationality: Why Social Context Matters." Interactive Minds, Life-Span Perspecives on the Social Foundation of Cognition, Chapter 11, edited by Paul B. Baltes et al., Cambridge University Press, 1996, Abstract, p. 319.

Granjal, Jorge, et al., "Security for the Internet of Things: A Survey of Existing Protocols and Open Research Issues." IEEE Communications Surveys & Tutorials, vol. 17, issue 3, Jan. 9, 2015, Abstract.

Greengard, Samuel. "The Internet of Things." The MIT Press, 2015, pages of Introduction, pp. 3-6 and 9-13.

Hax, Arnoldo, C. et al., "The Delta Model: Adaptive Management for a Changing World." Sloan Management Review, Winter 1999, vol. 40, issue 2, pp. 11-28.

Holler Jan, et al., "From Machine-to-Machine to the Internet of Things: Introduction to a New Age of Intelligence." Elsevier Ltd., 2014, Chapter 2 (pp. 9-37) and Chapter 9 (pp. 225-231).

Kennedy, Paul. "The Rise and Fall of the Great Powers." Random House, 1987, Introduction, 24 pages.

Lee, I., et al., "The Internet of Things (IoT): Applications, Investments, and Challenges for Enterprises." Business Horizons, vol. 58, issue 4, Jul.-Aug. 2015, pp. 431-440, Abstract.

Manne, Henry G. Insider Trading and the Law Professers. Insider Trading and the Law Professors, 23 Vand. L. Rev. 547, 1969-1970, Abstract.

Nelson, Douglas L., et al., "The University of South Florida Homograph Norms." Behavior Research Methods & Instrumentation. 1980, vol. 12, issue 1, pp. 16-37.

North, D. Warner. "A Tutorial Introduction to Decision Theory." IEEE Transactions on Systems Science and Cybernetics, vol. 4, issue 3, Sep. 1968, Abstract.

Rumizen, Melissie Clemmons. "The Complete Idiot's Guide to Knowledge Management." John A. Woods, CWL Publishing Enterprises, 2002, Introduction, pp. 1, 4-13, 16-23, 25, 65, 107, 237, 303, 310, and 312.

Sanchez Lopez, Tomas, et al., "Adding Sense to the Internet of Things." Pers Ubiquit Comput, 2012, vol. 16, pp. 291-308.

Stark, John. "Product Lifecycle Management." 2015, vol. 1, Decision Engineering. pp. 1-29, Abstract.

Swetina, Jorg, et al., "Toward a Standardized Common M2M Service Layer Platform: Introduction to oneM2M." IEEE Wireless Communications, vol. 21, issue 3, Jun. 2014, Abstract.

* cited by examiner

DEVICE ENROLLMENT IN A CLOUD SERVICE USING AN AUTHENTICATED APPLICATION

CLAIM OF PRIORITY

This application claims the benefit of priority under 35 U.S.C. § 119(e) to U.S. Provisional Patent Application Ser. No. 62/273,782, filed on Dec. 31, 2015, the benefit of priority of which is claimed hereby, and which is incorporated by reference herein in its entirety.

TECHNICAL FIELD

Embodiments of the present disclosure relate generally to data processing and, more particularly, but not by way of limitation, to a method and system for enrolling devices with cloud-based services.

BACKGROUND

The Industrial Internet represents generally a connection of devices, machines and industrial big data. Service and manufacturing companies have begun to embrace the Industrial Internet to drive performance benefits and generate value. Participants leverage connectivity and analytics to achieve business priorities like increasing throughput, improving product quality, driving resource efficiency, shortening response times, or other valuable outcomes.

To capture the full potential of optimization, companies not only need to understand a current state of operations, but also have the ability to predict what will happen before it occurs. Although some industrial machines are configured to issue early warnings, such warnings may be delivered in an inconsistent way or in a manner where details crowd out critical information. Networked machines with embedded sensors and advanced analytics tools are starting to change that.

Using the Industrial Internet, participants can leverage advanced analytics such as to provide real-time operational intelligence to the people or machines who need it to make informed decisions. In some cases, such predictions or intelligence can be used to proactively avoid issues before they occur, which in turn can enable continuous operation.

BRIEF DESCRIPTION OF THE DRAWINGS

Various ones of the appended drawings merely illustrate example embodiments of the present disclosure and cannot be considered as limiting its scope.

Figure 1:
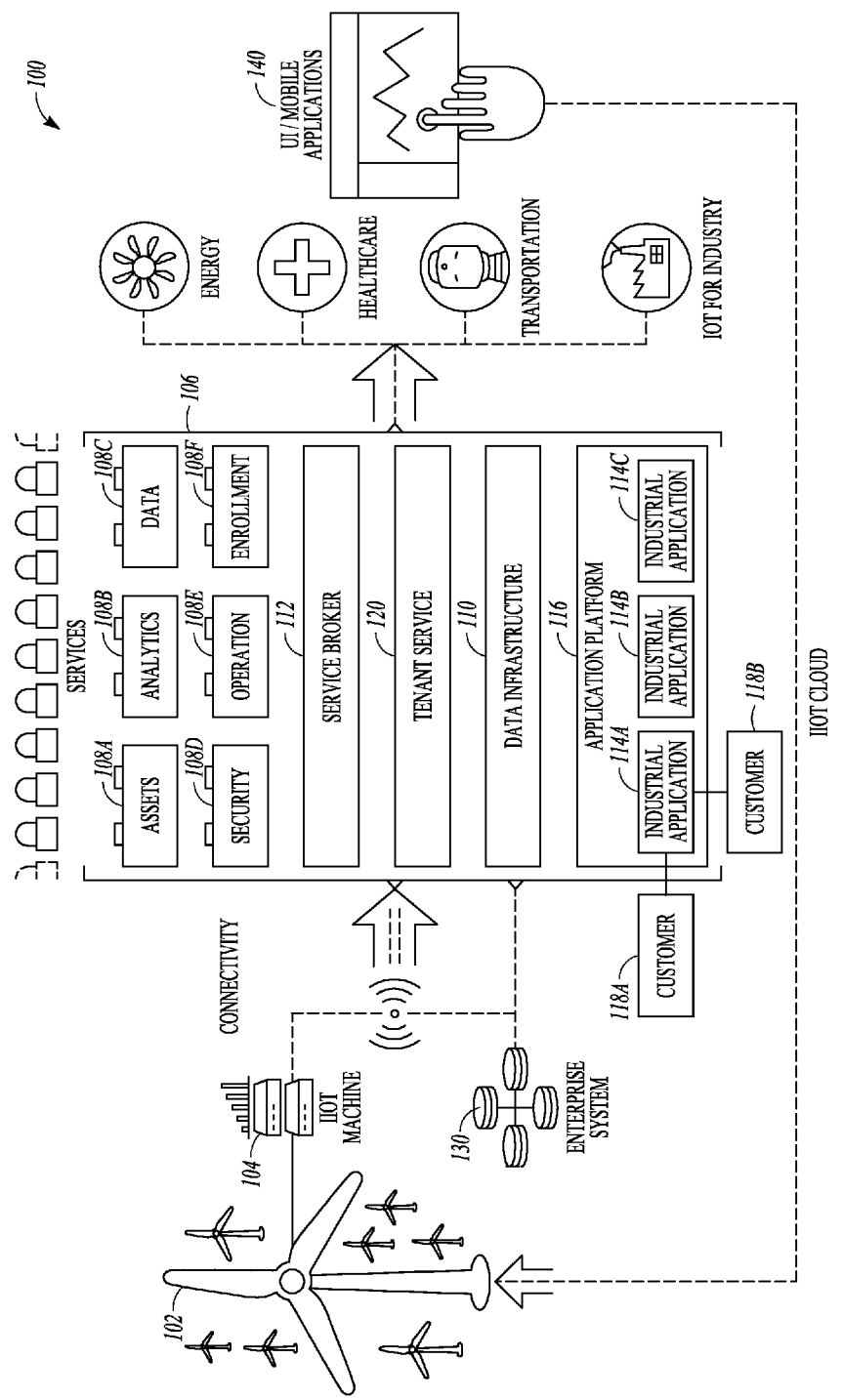
FIG. 1 is a block diagram illustrating an Industrial Internet of Things (IIoT) system, in accordance with an example embodiment.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, systems and methods are provided to facilitate enrollment of devices or machines with a central or distributed server, such as a cloud-based server. The enrollment procedures can include mechanisms to authenticate devices with one or more services or applications at the server. As used herein, the term "service" generally corresponds to an application that can be executed on a device or server, such as can be located internally or externally to a cloud environment. In an example embodiment, cloud-based services can treat devices as users, such as OAuth2 users. That is, in accordance with an example embodiment, the enrollment services described herein can facilitate enrollment of a device as an OAuth2 client, and then provide for ongoing use of OAuth2 access tokens to exchange data between endpoints, such as between a device bearing a token and various cloud-based services. Generally, the term "device" is used herein to refer to a machine or other entity that includes a processor circuit and is configured to exchange information with a third party, such as a cloud-based service or application.

Some of the technical challenges involved in an Industrial Internet of Things (IIoT) include items such as predictive maintenance, where industrial assets can be serviced prior to problems developing to reduce unplanned downtimes. One technical challenge involves prediction of when industrial assets or parts thereof will fail. In an example embodiment, an IIoT can monitor data collected from device-based sensors and, using physics-based analytics, detect potential error conditions based on an asset model (i.e., a model corresponding to the device). The asset in question can then be taken off-line or shut down for maintenance at an appropriate time. In addition to these types of edge applications (applications involving the industrial assets directly), the IIoT can pass sensor data to a cloud environment where operational data for similar machines under management can be stored and analyzed. Over time, data scientists can identify patterns or develop improved physics-based analytical models corresponding to the various machines. Updated analytical models can be pushed back to one or more of the assets that the models represent, and performance of the one or more assets can be correspondingly improved.

FIG. 1 is a block diagram illustrating an IIoT system 100, in accordance with an example embodiment. An industrial asset 102, such as a wind turbine as depicted here, may be directly connected to a device such as an IIoT machine 104. The IIoT machine 104 can be a device, machine, software stack embedded into a hardware device, an industrial control system, or a network gateway, among other things. In an example embodiment, the software stack can include its own software development kit (SDK). The SDK can include functions that enable developers to leverage various core features, such as described below. In the example embodiment of FIG. 1, the industrial asset 102 is a member of an asset community, and the IIoT machine 104 can be coupled to one or more members of an asset community.

One responsibility of the IIoT machine 104 can be to provide secure, bi-directional cloud connectivity to, and management of, industrial assets, while also enabling applications (analytical and operational services) at the edge of the IIoT. The latter permits the delivery of near-real-time processing in controlled environments. Thus, the IIoT machine 104 connects to an IIoT cloud 106, which includes various modules, such as described below.

The IIoT machine 104 can provide security, authentication, and governance services for endpoint devices. This allows security profiles to be audited and managed centrally across devices, ensuring that assets are connected, controlled, and managed in a safe and secure manner, and that critical data is protected. In an example embodiment, the IIoT machine 104 can support gateway solutions that connect multiple edge components via various industry standard protocols, such as to meet various requirements for industrial connectivity.

In an example embodiment, the IIoT cloud 106 includes an asset module 108A, analytics module 108B, data module 108C, security module 108D, operations module 108E, and enrollment module 108F, as well as data infrastructure 110. This allows other computing devices, such as client computers running user interfaces/mobile applications to perform various analyses of either the individual industrial asset 102 or multiple assets of the same type. Each of the modules 108A-108F includes or uses a dedicated circuit, or instructions for operating a general purpose processor circuit, to perform the respective functions. In an example embodiment, the modules 108A-108F are communicatively coupled in the IIoT cloud 106 such that information from one module can be shared with another. In an example embodiment, the modules 108A-108F are co-located at a designated datacenter or other facility, or the modules 108A-108F can be distributed across multiple different locations.

FIG. 1 includes an interface device 140 that can be configured for data communication with one or more of the IIoT machine 104 or IIoT cloud 106. The interface device 140 can be used to monitor or control one or more assets or machines that are coupled to the IIoT cloud 106. In an example embodiment, information about the industrial asset 102 is presented to an operator at the interface device 140. The information about the industrial asset 102 can include information from the IIoT machine 104, or the information can include information from the IIoT cloud 106. In an example, the information from the IIoT cloud 106 includes information about the industrial asset 102 in the context of multiple other similar or dissimilar assets, and the interface device 140 can include options for optimizing one or more members of an asset community to which the industrial asset 102 belongs, such as based on analytics performed at the IIoT cloud 106.

In an example embodiment, an operator selects a parameter update for the industrial asset 102 (e.g., a first wind turbine) using the interface device 140, and the parameter update is pushed to the industrial asset 102 via one or more of the IIoT cloud 106, the IIoT machine 104, or using some other communication gateway. In an example embodiment, the interface device 140 is in data communication with an enterprise computing system 130 and the interface device 140 provides an operation with enterprise-wide data about the industrial asset 102 in the context of other business or process data. For example, choices with respect to asset optimization can be presented to an operator in the context of available or forecasted raw material supplies or fuel costs.

In an example embodiment, choices with respect to asset optimization can be presented to an operator in the context of a process flow to identify how efficiency gains or losses at one asset impacts other assets. In an example embodiment, one or more choices described herein as being presented to a user or operator can alternatively be made automatically by a processor circuit according to earlier-specified or programmed operational parameters. In an example embodiment, such a processor circuit can be located at one or more of the interface device 140, the IIoT cloud 106, the enterprise computing system 130, or elsewhere.

Figure 2:
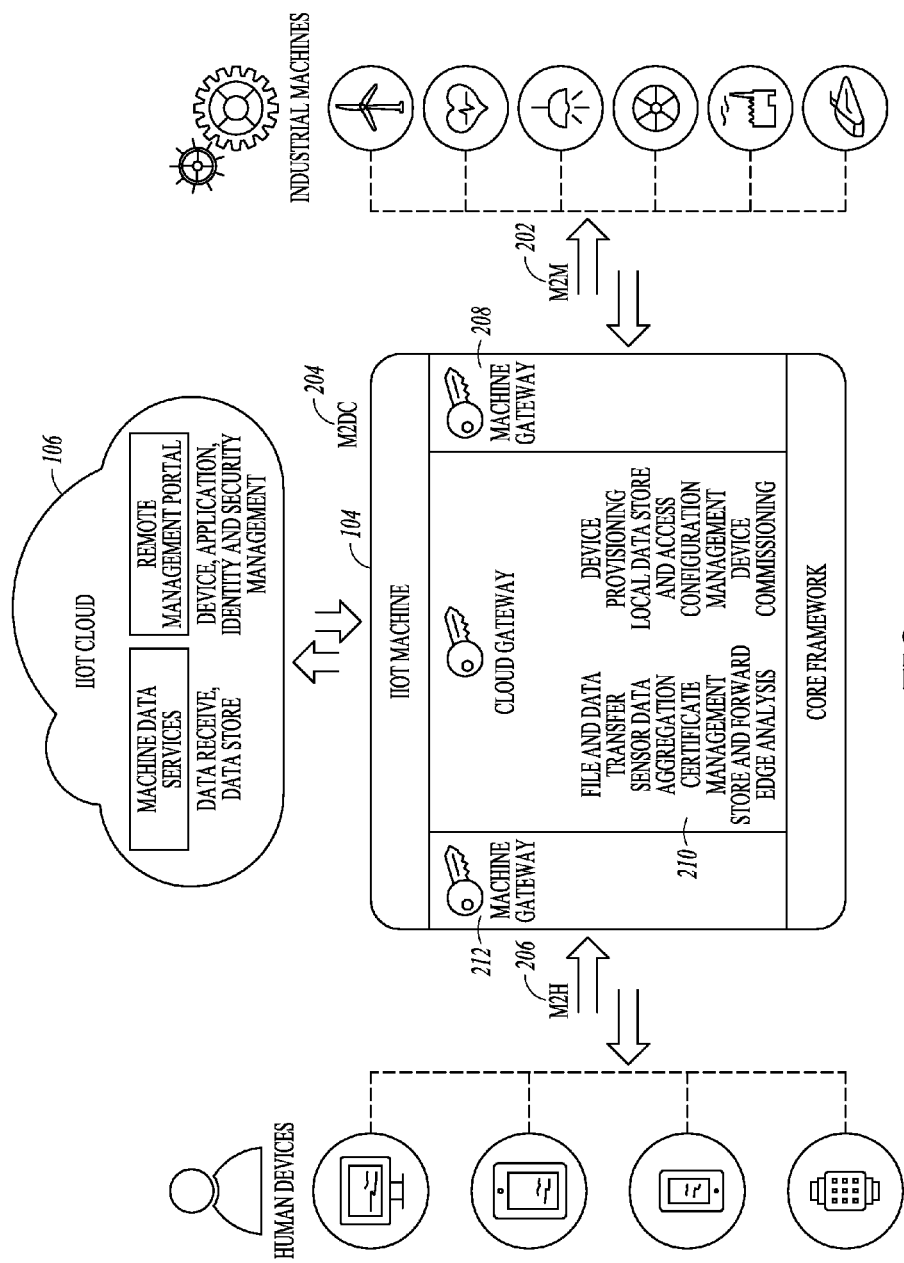
FIG. 2 is a block diagram illustrating different edge connectivity options for an IIoT machine, in accordance with an example embodiment.

FIG. 2 is a block diagram illustrating different edge connectivity options for the IIoT machine 104, in accordance with an example embodiment. There are generally three types of edge connectivity options that an IIoT machine 104 provides: machine gateway (M2M) 202, cloud gateway (M2DC) 204, and mobile gateway (M2H) 206.

Many assets can support connectivity through industrial protocols such as Open Platform Communication (OPC)-UA or ModBus. A machine gateway component 208 may provide an extensible plug-in framework that enables connectivity to assets via M2M 202 based on these common industrial protocols or other protocols.

A cloud gateway component 210 connects the IIoT machine 104 to the IIoT cloud 106 via the cloud gateway M2DC 204. In an example embodiment, the IIoT machine 104 can be coupled with the IIoT cloud 106 using a cloud communication protocol, such as can include HTTPS, Web Sockets, or some other protocol.

In an example embodiment, a mobile gateway component 212 can enable a direct connection to the industrial asset 102 from the IIoT machine 104. The mobile gateway component 212 can be used, for example, to administer maintenance or to perform system updates. In an example embodiment, a service technician deployed to maintain or repair a device can connect directly from a technician device to the IIoT machine 104, such as to retrieve information about the asset's operating conditions or to perform troubleshooting. In some industrial environments, such as where connectivity can be challenging, an ability to bypass the cloud and create a direct connection to an asset can be helpful.

As described briefly above, there are a series of core capabilities provided by the IIoT system 100. Industrial scale data, which can be massive and is often generated continuously, cannot always be efficiently transferred to the cloud for processing, unlike data from consumer devices. Edge analytics can provide a way to preprocess data so that only specified or pertinent data is sent to the IIoT cloud 106. Various core capabilities can include file and data transfer, store and forward, local data store and access, sensor data aggregation, edge analytics, certificate management, device provisioning, device decommissioning, and configuration management.

The IIoT machine 104 can be deployed in various different ways. For example, the IIoT machine 104 can be deployed on the gateway, on controllers, or on sensor nodes. The gateway can act as a smart conduit between the IIoT cloud 106 and the asset(s) 102. The IIoT machine 104 can be deployed on the gateway device to provide connectivity to asset(s) 102 via a variety of protocols.

The IIoT machine 104 can be deployed directly onto machine controller units. In this configuration, the machine software can be decoupled from machine hardware, such as to facilitate connectivity, upgradability, cross-compatibility, remote access, and remote control. It can also enable industrial and commercial assets that have traditionally operated standalone or in very isolated networks to be connected directly to the IIoT cloud 106, such as for data collection and live analytics.

In an example embodiment, the IIoT machine 104 can be deployed on sensor nodes. In this scenario, intelligence can reside in the IIoT cloud 106 and simple, low-cost sensors can be deployed on or near the various assets, such as at the asset 102. The sensors can be configured to receive or collect machine data or environment data and then provide the data to the IIoT cloud 106 (e.g., directly or through an IIoT gateway), where it can be stored, analyzed, or otherwise processed.

The IIoT cloud 106 enables the IIoT by providing a scalable cloud infrastructure that serves as a basis for platform-as-a-service (PaaS), which is what developers can use to create Industrial Internet applications for use in the IIoT cloud 106. Users can create applications to operate in the IIoT cloud 106. While the applications reside in the IIoT cloud 106, they can rely partially on a local IIoT machine 104 to provide various capabilities, such as to gather sensor data, to process data locally, or to push data to the IIoT cloud 106.

Referring back to FIG. 1, services or applications provided by the IIoT cloud 106 and generally available to applications designed by developers can include application-based asset services from asset module 108A, analytics services from analytics module 108B, data services from data module 108C, application security services from security module 108D, operational services from operations module 108E, and enrollment services from enrollment module 108F.

Asset services include applications configured to create, import, and organize asset models or associated business rules. Data services include applications to ingest, clean, merge, or store data using an appropriate storage technology, for example, to make data available to applications in a way most suitable to their use case.

Analytics services include applications to create, catalog, orchestrate, or perform analytics that can serve as a basis for applications to create insights about industrial assets. Application security services include applications to meet end-to-end security requirements, including those related to authentication and authorization. In an example embodiment, application security services include an authorization service application that can be used to assess device or user credential data and selectively grant access to other services.

Operational service applications can enable application developers to manage the lifecycle or commercialization of their applications. Operational services can include development operational services, which can be applications to develop or deploy Industrial Internet applications in the IIoT cloud 106, as well as business operational applications, which can be applications that enable transparency into the usage of Industrial Internet applications so that developers can enhance profitability. Enrollment service applications can enroll or commission machines or devices for use with one or more other devices or applications available in or via the IIoT cloud 106.

In an example embodiment, an asset model provides a centerpiece of one or more Industrial Internet applications. While assets are the physical manifestations of various asset types (types of industrial equipment, such as turbines), an asset model can include a digital representation of the asset's structure. In an example embodiment, an asset service provides Application Program Interfaces (APIs), such as Representational State Transfer (REST) APIs that enable application developers to create and store asset models that define asset properties, as well as relationships between assets and other modeled elements. Application developers can leverage the service to store asset-instance data. For example, an application developer can create an asset model that describes a logical component structure of all turbines in a wind farm and then create instances of that model to represent each individual turbine. Developers can also create custom model objects to meet their own unique domain needs.

In an example embodiment, the asset module 108A may include an API layer, a query engine, and a graph database. The API layer acts to translate data for storage and query in the graph database. The query engine enables developers to use a standardized language, such as Graph Expression Language (GEL), to retrieve data about any object or property of any object in the asset service data store. The graph database stores the data.

An asset model represents information that application developers store about assets, how assets are organized, and how they are related. Application developers can use the asset module 108A APIs to define a consistent asset model and a hierarchical structure for the data. Each piece of physical equipment may then be represented by an asset instance. Assets can be organized by classification and by any number of custom modeling objects. For example, an organization can use a location object to store data about where its pumps are manufactured, and then use a manufacturer object to store data about specific pump suppliers. It can also use classifications of pumps to define pump types, to assign multiple attributes, such as a material type, to each classification, and to associate meters or values to a classification.

Data service applications from the data module 108C enable Industrial Internet application developers to bring data into the system and make it available for their applications. Data can be ingested via an ingestion pipeline that allows for data to be cleansed, merged with data from other data sources, and stored in the appropriate type of data store, whether it be a time series data store for sensor data, a Binary Large Object (BLOB) store for medical images, or a relational database management system (RDBMS).

Since many of the assets are industrial in nature, much of the data that enters the IIoT system 100 for analysis is sensor data from industrial assets. In an example embodiment, a time series service may provide a query efficient columnar storage format optimized for time series data. As a continuous stream of information flows in from various sensors for analysis, such as based on time, an arrival time of each stream can be maintained and indexed in this storage format for more efficient queries. The time series service can also provide an ability to efficiently ingest massive amounts of data based on extensible data models. The time series service capabilities address operational challenges posed by the volume, velocity, and variety of IIoT data, such as efficient storage of time series data, indexing of data for quick retrieval, high availability, horizontal scalability, and data point precision.

In an example embodiment, application security service applications can be provided by the security module 108D, such as including user account and authentication (UAA) and access control. The UAA service provides a mechanism for applications to authenticate users or devices by setting up a UAA zone. An application developer can bind an application to the UAA service and then use services such as basic login and logout support for an application, such as without needing to recode such services for each application. Access control can be provided as a policy-driven authorization service that can enable applications to create access restrictions to resources based on various criteria.

Thus, a situation arises where application developers wishing to create industrial applications for use in the IIoT may wish to use common services that many such industrial applications may use, such as a log-in page, time series management, data storage, and the like. A developer can utilize such services, for example, by instantiating instances of the services and having applications consume those instances. Typically, many services may be so instantiated.

In an example embodiment, applications or functions of the IIoT cloud 106 can be multi-tenant. Multi-tenant applications permit different customers of an application to "share" the application (e.g., in the cloud environment), such as while maintaining their respective data privately from each other (called "isolation"). In such circumstances, an application may instantiate different instances of each of multiple services used by an application for the different customers. This arrangement can be time consuming and resource intensive, for example, because each instance is instantiated separately and then bound to the application.

Instantiations and bindings can be performed using a service broker 112. Applications 114A-114C, such as can be executed at the IIoT cloud 106, can be hosted by application platform 116. Customers 118A-118B can interact with applications 114A-114C to which they have subscribed. In the example of FIG. 1, customers 118A and 118B subscribe to, or are tenants of, application 114A. A tenant service 120 may be used to manage tenant-related modifications, such as management of templates and creation of tenants.

Figure 3:
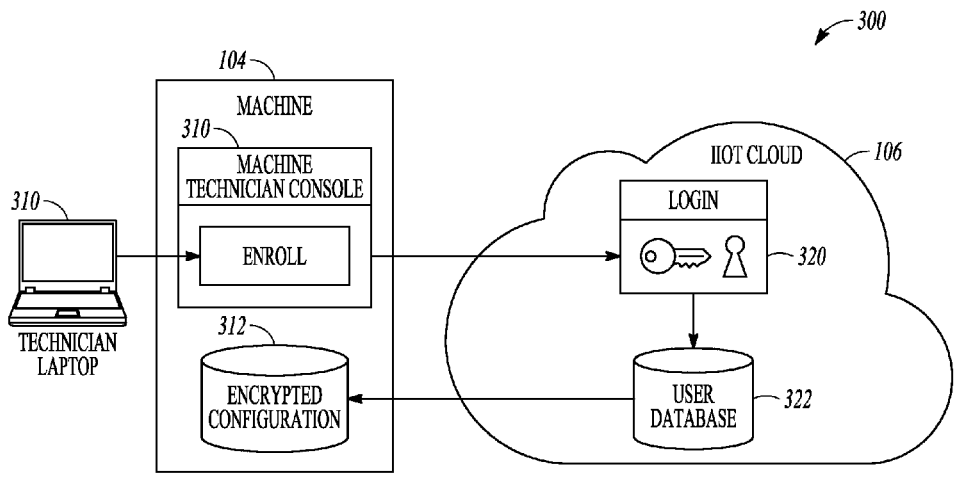
FIG. 3 is a block diagram illustrating several participants in a device enrollment process, in accordance with an example embodiment.

Devices can be required to register to enroll with one or more service applications in the IIoT cloud 106 in order to access the services or applications on a temporary or ongoing basis. FIG. 3 is a block diagram illustrating several participants in a device enrollment process, in accordance with an example embodiment. The block diagram of FIG. 3 includes the IIoT machine 104 and the IIoT cloud 106. At the beginning of an enrollment process, the IIoT cloud 106 can optionally have no prior knowledge of a device or devices to be commissioned. In an example embodiment, an enrollment service application provided at the IIoT cloud 106 can permit a technician to create or register a device identity without requiring device-specific credential data. That is, the IIoT machine 104 or other device can register or enroll with the IIoT cloud 106 even if the machine or device is not previously authorized or known to a service at the IIoT cloud 106.

In the example embodiment of FIG. 3, a technician laptop 301 is used to contact an enrollment portal 310 associated with the IIoT machine 104, which in turn can contact a login portal 320 at the IIoT cloud 106 with a device enrollment request. In an example embodiment, technician credential data (e.g., credential data associated with a particular human technician) are used to negotiate device enrollment. The login portal 320 negotiates login credential data, such as associated with a human technician, and other user information using a user database 322. If the technician credential data are accepted, then one or more tokens can be sent from the IIoT cloud 106 to the IIoT machine 104. Optionally, the one or more tokens are encrypted and maintained at the IIoT machine 104 such as in a repository 312. The tokens can then be used by the IIoT machine 104 to establish data communication paths between the IIoT machine 104 and one or more services or applications at the IIoT cloud 106.

In the example embodiment of FIG. 3, the enrollment portal 310 includes a web console that operates on the IIoT machine 104. In an example embodiment, the web console can require valid credential data to operate, and a technician can log in to the web console using technician credential data. Optionally, the technician encounters an "Enroll" or similar interface object that can be selected to initiate an enrollment or commissioning process. In response to the technician's selection of the interface object, the IIoT machine 104 can contact the IIoT cloud 106. In an example embodiment, the technician enters the same or different credential data to log in to an enrollment service application at the IIoT cloud 106. In an example embodiment, technician credential data accepted at the enrollment portal 310 of the IIoT machine 104 grant temporary authorization to the IIoT machine 104 to communicate with the enrollment service application at the IIoT cloud 106. For example, the IIoT machine 104 can obtain an authorization code from the IIoT cloud 106 that enables, for a specified duration, communication between the IIoT machine 104 and one or more designated services at the IIoT cloud 106.

At the IIoT cloud 106, and in response to receiving the technician credential data, the enrollment service application at the IIoT cloud 106 can prepare a new account for the IIoT machine 104. The enrollment service application can return various information to the IIoT machine 104, such as tokens, scopes, or other information that can be stored at the IIoT machine 104 in one or more secure, encrypted files. In an example embodiment, once the IIoT machine 104 is enrolled with the IIoT cloud 106, the IIoT machine 104 can automatically obtain access tokens using the encrypted information. The access tokens can be included in any subsequent request sent to the IIoT cloud 106.

Figure 4:
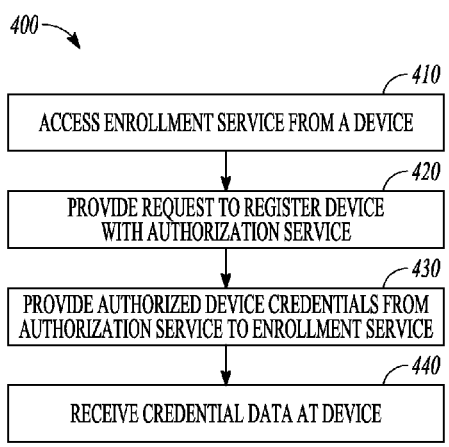
FIG. 4 is a flow diagram illustrating a method of an enrollment process, in accordance with an example embodiment.

FIG. 4 is a flow diagram illustrating a method 400 of an enrollment process, in accordance with an example embodiment. The method 400 can use one or more components illustrated in the example of FIG. 3. In an example embodiment, the method 400 involves the IIoT machine 104, and multiple cloud-based services residing at the IIoT cloud 106. The cloud-based services include an enrollment service application that brokers new enrollment requests and an authorization service application that handles various authentication procedures.

At operation 410, the method 400 includes accessing an enrollment service application from a device, such as from the IIoT machine 104. The enrollment service application can include a service operated or performed at the IIoT cloud 106. In an example embodiment, the IIoT machine 104 is granted temporary access to the enrollment service application based on credential data of a user of the IIoT machine 104. For example, a technician operating the IIoT machine 104, or operating a device in communication with the IIoT machine 104, can provide his or her credential data to initiate the temporary access for the IIoT machine 104 to the enrollment service application at the IIoT cloud 106.

At operation 420, the method 400 includes providing a request to register a device, such as the IIoT machine 104, with an authorization service application. The request to the authorization service application can be made from the enrollment service application. The method 400 proceeds with further communication between the authorization service application and the enrollment service application. For example, at operation 430, the method 400 includes registering the IIoT machine 104 with the authorization service application, including using the authorization service application to provide, to the enrollment service application, an indication of authorized device credential data corresponding to the IIoT machine 104. That is, device credential data or identification information corresponding to the IIoT machine 104 can be provided to the enrollment service application from the authorization service application, such as to indicate that the enrollment service application can or should accept requests from a device bearing the credential data.

At operation 440, the method 400 includes receiving credential data at a device, such as at the IIoT machine 104. For example, in response to successfully enrolling the IIoT machine 104 with the enrollment service application (e.g., at operation 430), device credential data can be provided from the enrollment service application or the authorization service application to the IIoT machine 104. The device credential data can be configured to grant the IIoT machine 104 subsequent access to one or more cloud-based services at the IIoT cloud 106. The access can be finite or ongoing according to expiration or other access parameters that are defined by the authorization service application and/or the enrollment service application.

Figure 5:
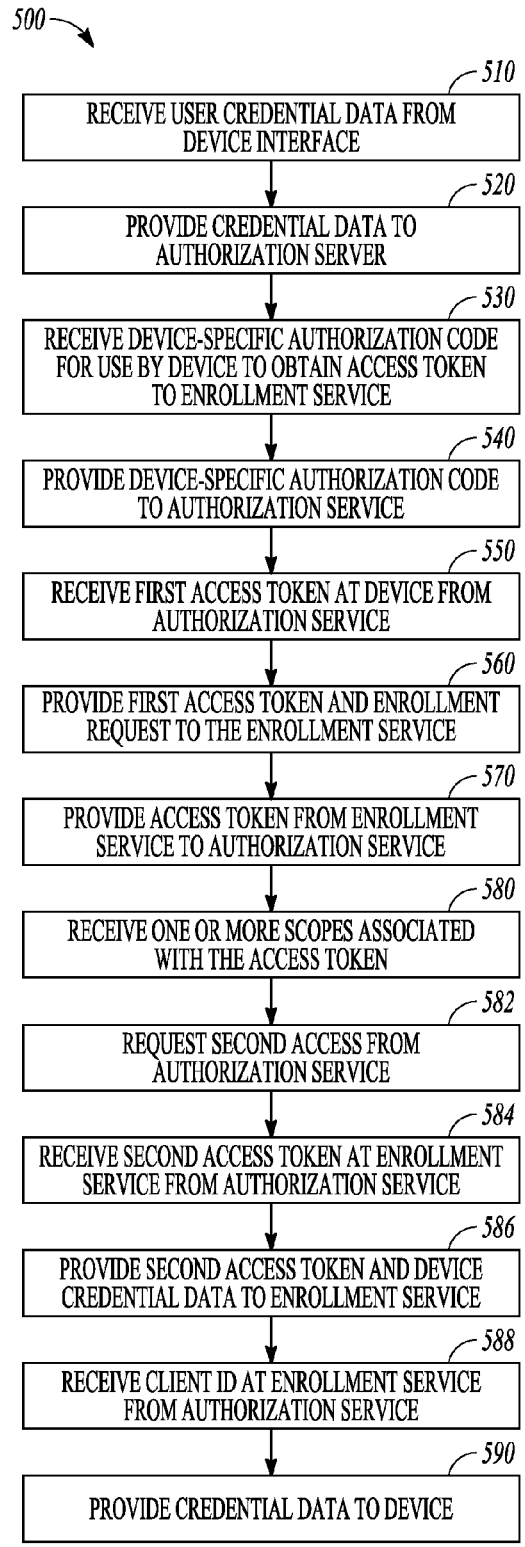
FIG. 5 is a flow diagram illustrating a method of accessing an enrollment service from a device, in accordance with an example embodiment
Figure 6:
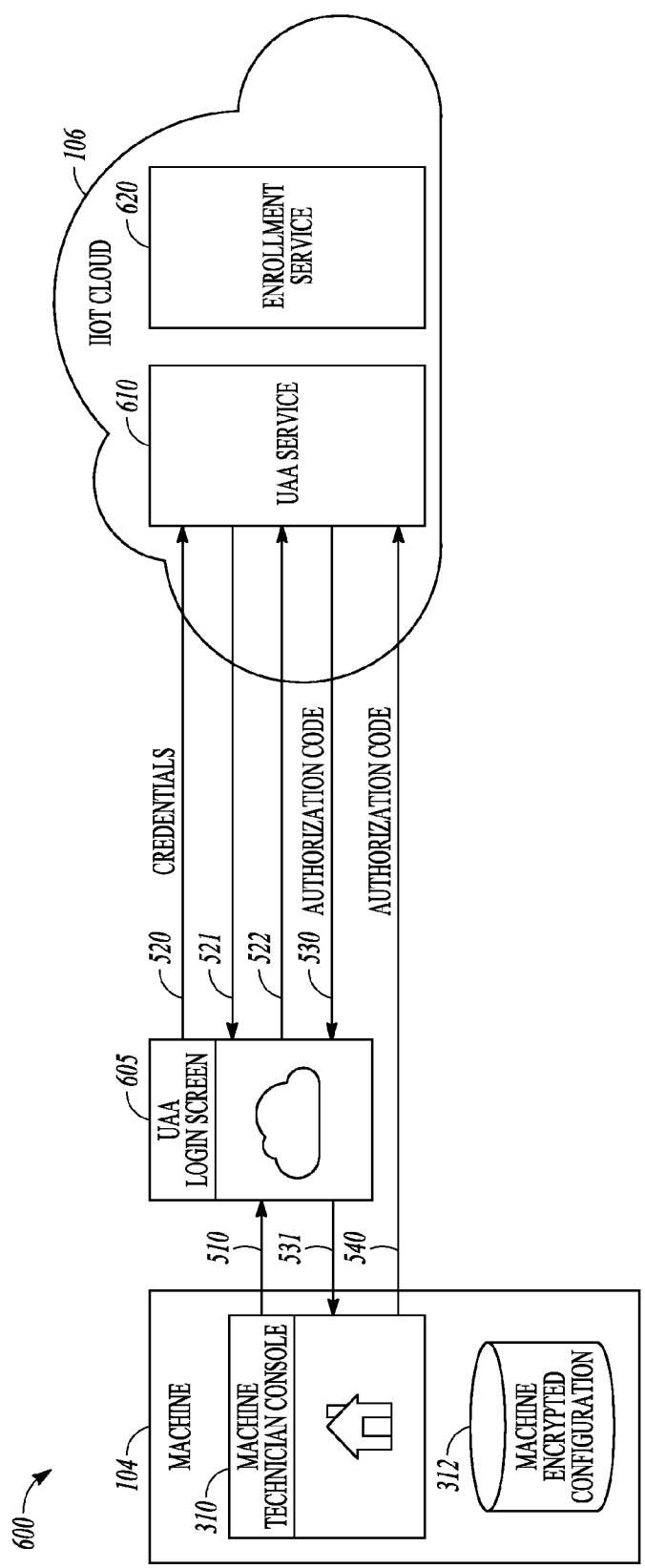
FIG. 6 is a block diagram illustrating device and cloud components used in an enrollment process, in accordance with an example embodiment.
Figure 7:
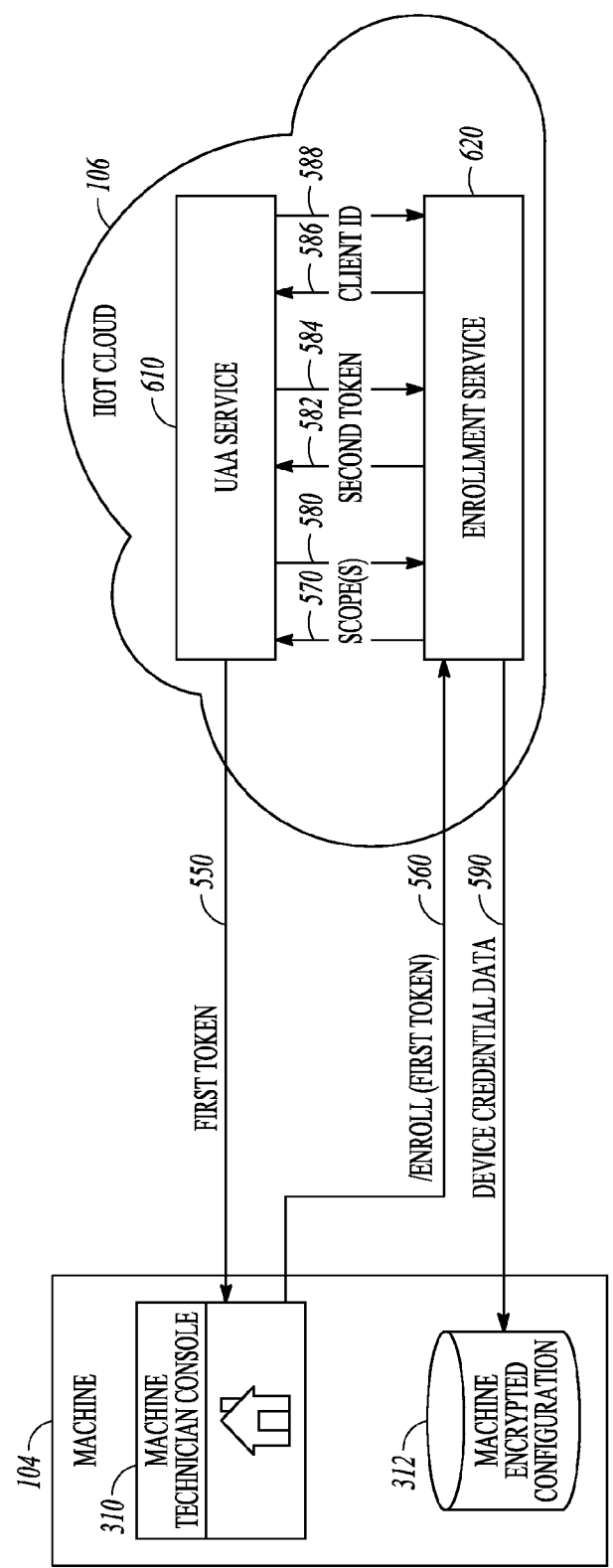
FIG. 7 is a block diagram illustrating device and cloud components used in an enrollment process, in accordance with an example embodiment.

FIG. 5 is a flow diagram illustrating a method 500 of accessing an enrollment service application from a device, such as from the IIoT machine 104, in accordance with an example embodiment. The example of FIG. 5 is further illustrated in the context of block diagrams in FIGS. 6 and 7. FIGS. 6 and 7 are block diagrams illustrating device and cloud components used in an enrollment process. The figures illustrate the IIoT machine 104 and the IIoT cloud 106. The IIoT machine 104 includes a technician console or enrollment portal 310 and the repository 312 for encrypted configuration information associated with the machine. The IIoT cloud 106 includes a UAA service 610 (e.g., provided at least in part by the security module 108D) and an enrollment service application 620 (e.g., provided at least in part by the enrollment module 108F). A UAA interface 605 or login screen is illustrated to indicate the portal between the IIoT machine 104 and the UAA service 610.

Operations from the flow diagram of FIG. 5 can be mapped to the block diagrams of FIG. 6 or 7 to illustrate an embodiment of an enrollment process. That is, FIGS. 6 and 7 illustrate several operations that provide example embodiments of some of the operations from FIG. 5. Numerical references for the operations of FIG. 5 are provided in the corresponding portions of FIGS. 6 and 7 to provide context for the operations.

At operation 510, the method 500 includes receiving user credential data from a device interface. In an example embodiment, the device interface is a hardware interface or terminal that is associated with the IIoT machine 104. In an example embodiment, the device interface includes a data communication link between the IIoT machine 104 and one or more external devices, such as a technician computer, laptop, tablet, or other device that can be coupled directly or indirectly (e.g., via the Internet or an intranet) to the IIoT machine 104. In the example embodiment of FIG. 6, operation 510 corresponds to providing or receiving technician credential data at the UAA interface 605. The UAA interface 605 can be instantiated at the IIoT machine 104, at a technician device, or at some other device that can facilitate or negotiate a login procedure. In an example embodiment, at operation 510, a technician can click on an "Enroll" button in a device console. In response to the technician's selection, a browser window can pop up and connect the technician with an /oauth/authorize endpoint in the associated UAA instance.

At operation 520, the method 500 includes providing credential data to an authorization server or an authorization service application, such as the UAA service 610. For example, technician credential data received at the UAA interface 605 can be provided to the UAA service 610 at the IIoT cloud 106. In an example embodiment, a request can be made to an /oauth/authorize endpoint at the UAA service 610. The /oauth/authorize request can require a login, so the UAA service 610 can redirect the IIoT machine 104 to a UAA login screen, for example, at operation 521 of FIG. 6. At operation 522, the technician can enter credential data at the UAA interface 605 and can be authenticated with the UAA service 610.

At operation 530, a device-specific authorization code can be returned to the IIoT machine 104 from an authorization service application, such as from the UAA service 610. The device-specific authorization code can be specified for a particular machine having a particular identification or serial number, or the device-specific authorization code can be specified for a particular class or type of machine.

In an example embodiment, a device authorization code can be sent from the UAA service 610 to the IIoT machine 104. The device-specific authorization code can then be used by the IIoT machine 104 to obtain an access token for use with the enrollment service application. At operation 530, the UAA service 610 can return an authorization code to the IIoT machine 104, for example, together with a redirect address to use to continue the enrollment process. In an example embodiment, at operation 531 of FIG. 6, the redirect address (e.g., URL) points to a RESTful endpoint hosted at the enrollment portal 310 (e.g., at a web console associated with the IIoT machine 104).

At operation 540, the method 500 includes providing the device-specific authorization code to an authorization service application, such as the UAA service 610, from the IIoT machine 104. Providing the device-specific authorization code can include providing an explicit request for an access token from the authorization service application, or providing the authorization code can be interpreted by the authorization service application as a request for an access token. In an example embodiment, the endpoint hosted at the enrollment portal 310 can submit, to the UAA service 610, a request for an OAuth2 access token using the received device-specific authorization code.

Referring now to FIGS. 5 and 7, at operation 550, the method 500 includes receiving a first access token at the IIoT machine 104 from an authorization service application, such as the UAA service 610. For example, if the authorization code and credential data submitted by the IIoT machine 104 (e.g., at 540) are accepted by the UAA service 610, then a first access token can be returned to the IIoT machine 104.

At operation 560, the method 500 includes using the IIoT machine 104 to provide the first access token to an authorization service application, such as the UAA service 610. In an example embodiment, the IIoT machine 104 provides the first access token to the enrollment service application 620 together with an enrollment request. In an example embodiment, the IIoT machine 104 sends a POST request to an /enroll endpoint at the enrollment service application 620 with the access token (e.g., from operation 550) included in an authorization header. The authorization header can optionally include a device identifier corresponding to the IIoT machine 104.

At operation 570, the method 500 includes providing a subsequent access token from the enrollment service application 620 to an authorization service application, such as the UAA service 610. In an example embodiment, the enrollment service application 620 receives the first access token at operation 560, and then at operation 570, the enrollment service application 620 sends the same first access token to the UAA service 610. The enrollment service application 620 can optionally update header or other information associated with the first access token before it sends the token to the UAA service 610. The UAA service 610 performs a validation routine to determine whether the received token is valid. If the token is valid, then the method 500 continues at operation 580.

At operation 580, the method 500 includes receiving, at the enrollment service application 620 and from an authorization service application, such as the UAA service 610, one or more scopes associated with the first access token. In an example embodiment, the UAA service 610 maintains or accesses various scopes that can be associated with tokens. The scopes can define whether a particular machine or device connected to the UAA service 610 or to the IIoT cloud 610 is permitted access to a specified other service, module, data, or other feature available in or via the IIoT cloud 610. In an example embodiment, in response to the UAA service 610 receiving the first token at 570, the UAA service 610 returns to the enrollment service application 620 (or to another designated location or service) a list of valid scopes corresponding to the first token.

At operation 582, the method 500 includes using the enrollment service application 620 to request a second access token from an authorization service application, such as the UAA service 610. The enrollment service application 620 can analyze one or more of the scopes received at operation 580. If the scope(s) are valid, then the enrollment service application 620 requests the second access token from the UAA service 610. In an example embodiment, the enrollment service application 620 requests the second access token using a client credentials grant type under an OAuth2 framework. At operation 584, the method 500 includes receiving a second access token at the enrollment service application 620 from an authorization service application, such as the UAA service 610.

At operation 586, the method 500 includes providing the second access token to the enrollment service application, such as together with device credential data corresponding to the IIoT machine 104, to enroll a device. In an example embodiment, the enrollment service application 620 provides the second access token (e.g., the token received at operation 584) to the UAA service 610 with a client or device identifier. The client or device identifier can be particular to the IIoT 104, or particular to a specified group or type of devices.

In an example embodiment, the enrollment service application 620 further provides a random password or secret to the UAA service 610, such as together with the second access token. In an example embodiment, the enrollment service application 620 performs operation 586 using a POST request to an /oauth/clients endpoint at the UAA service 610. At operation 588, the method 500 includes receiving the client or device identifier at the enrollment service application 620 from an authorization service application, such as from the UAA service 610, when the enrollment succeeds. In an example embodiment, operation 588 includes receiving an additional or alternative indication, at the enrollment service application 620, that the enrollment was successful.

At operation 590, the method 500 includes providing credential data to the IIoT machine 104. In an example embodiment, the enrollment service application 620 transmits one or more of the client or device identifier, a password or secret, a token, or other data for use by the IIoT machine 104 in a subsequent authentication or access procedure, such as with the IIoT cloud 106 or with one of the cloud's services or modules. In an example embodiment, the IIoT machine 104 encrypts and stores the received credential data in a configuration file, such as in the repository 312.

In an example embodiment, after the enrollment procedure is completed, the IIoT machine 104 retains credential data in its repository 312. The IIoT machine 104 uses the credential data for subsequent access to one or more cloud services via the IIoT cloud 106 while the credential data remain valid. In an example embodiment, the IIoT machine 104 provides the credential data (e.g., including a client identification code and a client secret or password) to the UAA service 610 with a request for access to a specified service and, if the UAA service 610 determines that the request and credential data are valid, then the UAA service 610 can issue a token to the IIoT machine 104 for subsequent access to the specified service. In an example embodiment, the IIoT machine 104 engages the one or more cloud services directly, and the services contact the UAA service 610 for authorization.

In an example embodiment, device credential data can expire. Additionally or alternative, devices can be required to update their credentials occasionally to maintain security and system integrity. In an example embodiment, updated device credential data, such as including a new machine identifier or secret, can be issued from the enrollment service application 620 and/or from the UAA service 610 to enrolled devices. Credential updates can occur at timed intervals, after some specified number of logins or access events, or at some other time as specified by a user or programmer.

The UAA service 610, as a central authority that administers or defines access to cloud services, can be configured to manage relationships or access between the IIoT cloud 106, its services, and one or more machines or devices. For example, the UAA service 610 can be used as a central control authority that can revoke or meter access to one or more cloud services based on a particular machine or device identity. If access is revoked for a machine, then the machine can be required to re-enroll with the UAA service 610, such as following the procedure described in the example 500 of FIG. 5. In an example, revoked or suspended access can be changed by a technician with authority to update access parameters directly from the UAA service 610.

In an example embodiment, the UAA service 610 provides machine or device access to various services or to other machines based on one or more scopes associated with a machine. In an example embodiment, the UAA service 610 administers access to one or more services from machines of a specified machine type or class, or a specified group of machines, such as based on a scope that is common to the machines.

Enrollment with a cloud server can be achieved using the systems and methods described above. In an alternative or supplementary example embodiment, a machine or device can enroll with a cloud server without the assistance of or credential data related to a technician. Generally, to enroll or authenticate, a device will have to prove its identity using some element that is previously known to an authenticator, that is, to a server or service that provides authentication or validates enrollment.

In the case of a human user looking to authenticate himself or herself with a service, passwords (i.e., unique character strings) are generally used because a password cannot be easily extracted or derived from a human without the human's cooperation. In a device context, a password would have to persist somewhere on or in association with the device. The security of the device's password, therefore, depends upon security measures that are put in place on the device itself, such as physical accessibility measures or encryption.

Certificate-based authentication provides several qualities that are suitable for device-based authentication schemes. Certificates can be difficult to forge, and devices can be capable of securely storing certificates, e.g., in an encrypted repository. Furthermore, there is a substantial preexisting infrastructure to support certificates, for example in the PKI environment. Various features such as certificate issuance, trust, and revocation can be exploited from preexisting PKI tools.

A problem to be solved includes using certificate-based authentication, such as in an environment where two-way TLS may not work. In an example embodiment, the IIoT cloud 106 environment uses a load balancer to manage data transfers to or from the IIoT machine 104 (see, e.g., FIG. 10). In this context, two-way TLS may not be available between the IIoT machine 104 and various cloud services because the load balancer is positioned intermediately between the IIoT machine 104 and the destination cloud service. In order to use a client certificate (e.g., from the IIoT machine 104) for authentication, a TLS connection should extend all the way between the IIoT machine 104 and the destination service, and the destination service can provide verification on its own. However, in an example embodiment, requests from the IIoT machine 104 can be HTTP requests that arrive anonymously at the load balancer. Thus, a need exists to provide a mechanism for the IIoT machine 104 to prove its identity using a certificate and to have the certificate information extend through the load balancer to the destination service.

A solution to the problem described above can include using a URL-safe token, such as a JSON web token or JWT. An example of a suitable JWT token is provided below:

```
Header
{
"alg":"RS256"
}
Payload
{
"iss": <clientID>
"sub": "client_id"
"aud": <uaa>
"exp": <expiration time of this token>
}
Signature
SHA256withRSA(
<base64(Header)>.<base64(Payload)>,
<public key>,
<private key>
)
```

The above JWT token example can be signed and a certificate can be embedded in the token. To facilitate device enrollment, the token can be passed from a device (e.g., the IIoT machine 104) to an authentication service (e.g., the UAA service 610) through a load balancer. In an example embodiment, the load balancer is an F5 load balancer and a custom iRule is used to specify one or more destinations to which to route traffic, for example, to pools, to individual pool members, ports, or URIs.

Figure 8:
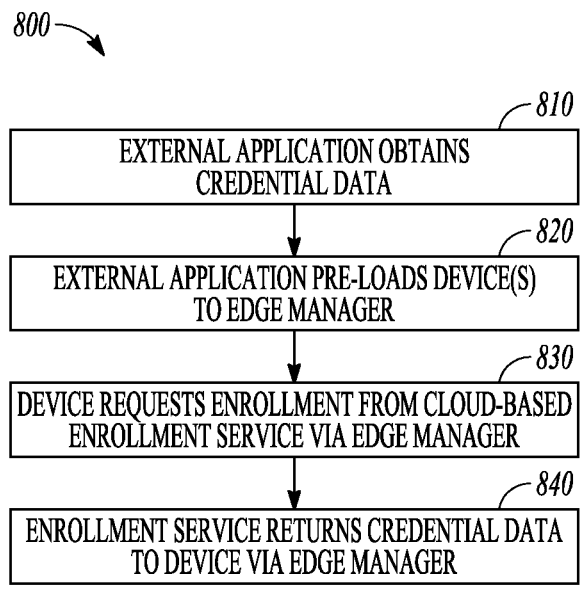
FIG. 8 is a flow diagram illustrating a method of an enrollment process, in accordance with an example embodiment
Figure 9:
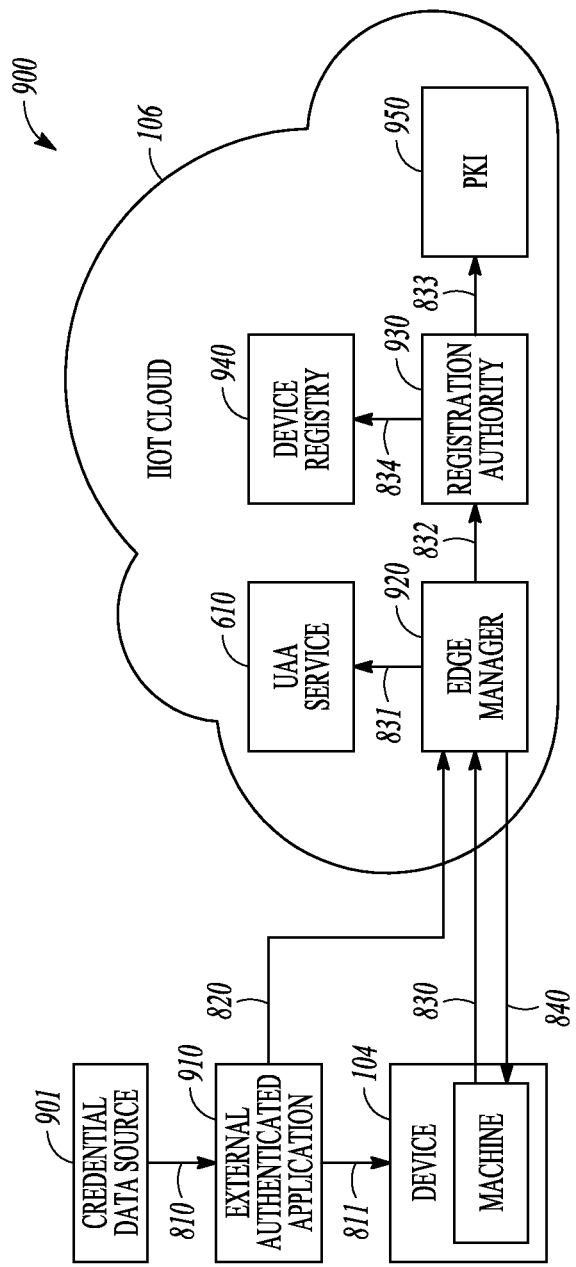
FIG. 9 is a block diagram illustrating device and cloud components used in an enrollment process, in accordance with an example embodiment.

FIG. 8 is a flow diagram illustrating a method 800 of an enrollment process, in accordance with an example embodiment. FIG. 9 is a block diagram illustrating device and cloud components used in an enrollment process, in accordance with an example embodiment. Operations from the flow diagram of FIG. 8 can be mapped to the block diagram of FIG. 9. That is, FIG. 9 illustrates an example embodiment of the operations from FIG. 8. Numerical references for the operations of FIG. 8 are provided in the corresponding portions of FIG. 9 to provide context for the operations.

In the example of FIG. 8, a device can enroll with a cloud-based service to obtain credential data or a certificate for later use in accessing the same or a different service. The enrollment procedure can begin at operation 810 by using an application (e.g., from a device or machine) to obtain device credential data. For example, operation 810 can include using an external authenticated application 910 from the example of FIG. 9. The external authenticated application 910 can be external to a cloud environment. In an example embodiment, the external authenticated application 910 obtains device credential data from a credential data source 901, such as including a manufacturer, commissioner, servicer, or other processor of one or more devices that are available for use with a cloud service. In the example of FIG. 9, at 811, the credential data obtained at 810 can be pre-loaded at the IIoT machine 104, optionally using the external authenticated application 910 to perform a portion of the pre-loading. In an example embodiment, the credential data pre-loading can be performed at a time or place of manufacture of the IIoT machine 104, or at some later time or other place.

The external authenticated application 910 can be authenticated with the IIoT cloud 106, for example, by way of a cloud edge manager 920. The edge manager 920 can create a notional asset that represents the authenticated application 910, and a client ID and secret can be created in the UAA service 610 for the external authenticated application 910. The client ID and secret credential data can be passed to the external authenticated application 910 for later use in communicating with the IIoT cloud 106, for example, via the edge manager 920.

At operation 820, the example of FIG. 8 includes pre-loading device identifiers to the edge manager 920. The edge manager 920 can be a load balancer or other hardware or software-implemented feature that receives and parses data at the IIoT cloud 106. By pre-loading device identifiers at the edge manager 920, the edge manager 920 can be pre-configured to accept a request from a device that bears or presents a device identifier that matches one of the pre-loaded identifiers. For example, the edge manager 920 can monitor headers of enrollment requests from remote devices. If a header includes a known device identifier, then the edge manager 920 can process the enrollment request.

At operation 830, the example includes using a device to request enrollment from a cloud-based enrollment service application via the edge manager 920. For example, operation 830 can include using the IIoT machine 104 to request enrollment via the edge manager 920, including providing the pre-loaded credential data from the IIoT machine 104 to the edge manager 920.

In an example embodiment, the IIoT machine 104 generates a certificate signing request (CSR) and provides this request to the edge manager 920. For example, the IIoT machine 104 can call an enroll API on the edge manager 920, and communicate to the enroll API the pre-loaded credential data, CSR, and any additional, device-identifier attributes, such as a MAC address, an IP address, an OS version, a BIOS version, or other information. In response, the edge manager 920 can request a new client with the UAA service 610 (see operation 831 in FIG. 9). The edge manager 920 can send the CSR to a registration authority 930 (operation 832), and the registration authority 930 can communicate with a PKI 950 (operation 833) for validation. In turn, a PKI 950 can sign the CSR and return it to the registration authority 930. The registration authority 930 can, in turn, register the signed certificate, such as together with the device-identifier attributes, with a device registry 940 (see operation 834 in FIG. 9).

Referring again to FIG. 8, at operation 840, the example includes using the enrollment service application to return credential data to the requesting device via the edge manager 920. For example, the registration authority 930 can return a certificate and client ID to the IIoT machine 104 by way of the edge manager 920.

Figure 10:
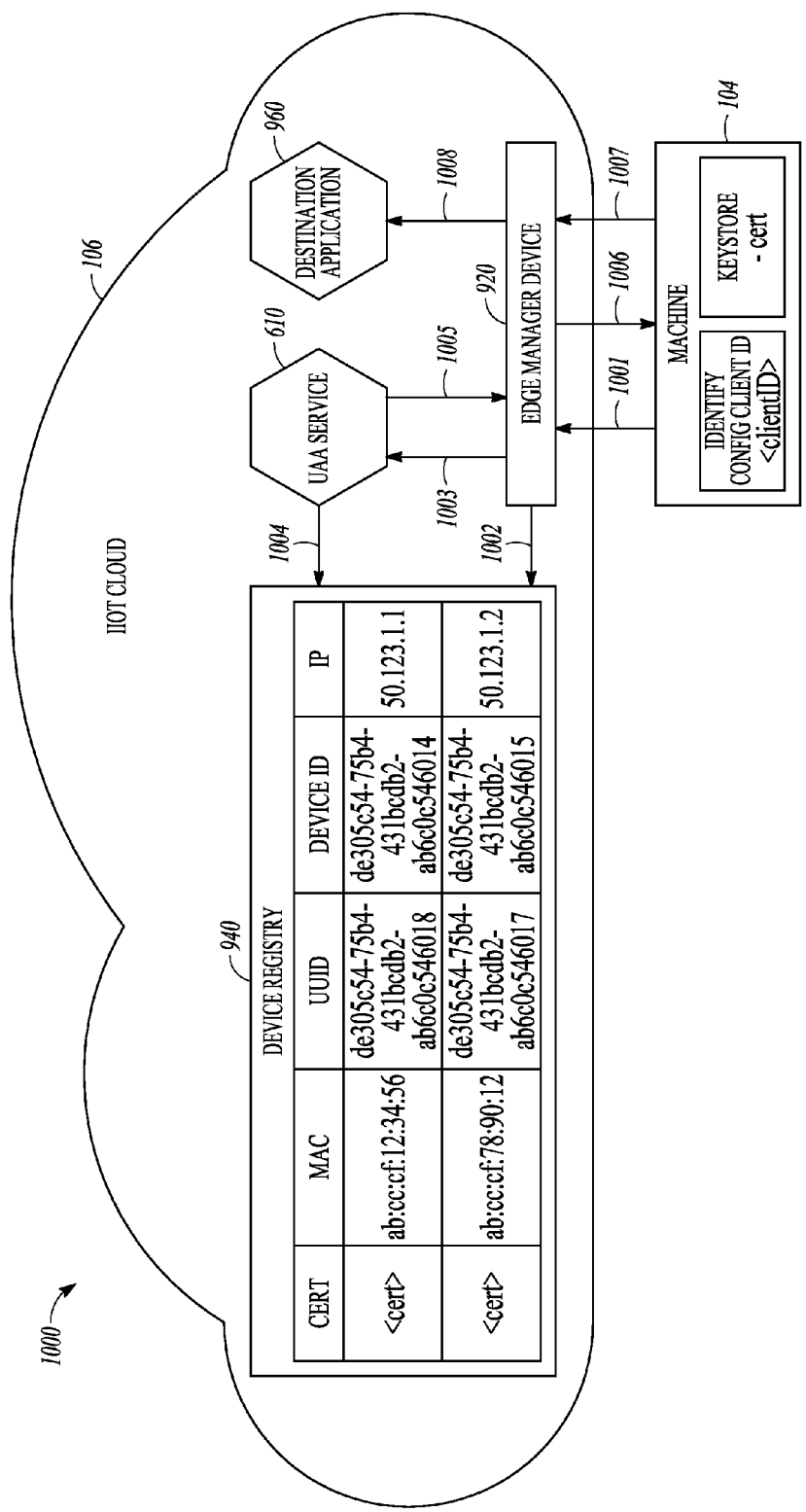
FIG. 10 illustrates a block diagram including a flow path for obtaining and using a token, in accordance with an example embodiment.

FIG. 10 illustrates a block diagram 1000 including a flow path for obtaining and using a token, in accordance with an example embodiment. The block diagram 1000 includes the IIOT machine 104 and the IIoT cloud 106. In the example embodiment of FIG. 10, the IIoT cloud 106 includes the edge manager 920, the UAA service 610, the device registry 940, and a destination application 960. As shown, the device registry 940 includes a list of one or more devices with one or more attributes associated with each device. In the example of FIG. 10, the device registry 940 includes a certificate, a MAC address, a UUID, a unique Device ID, and an IP address, for each device in the registry.

In accordance with the flow path illustrated in FIG. 10, the IIoT machine 104 uses its unique credential data (e.g., certificate, ID) to get an OAuth2 token from an authorization service application, such as from the UAA service 610, and then the IIoT machine 104 uses that token to communicate with a protected application, such as the destination application 960.

At operation 1001, the example embodiment includes using the IIoT machine 104 to prepare a JWT token, and to send an authentication request to the UAA service 610. The request can be made using two-way TLS to a destination location at the IIoT cloud 106. The destination location can include a location at the edge manager 920. In an example embodiment, a load balancer receives the request and terminates the TLS communication. At operation 1002, the example embodiment includes using the edge manager 920 to communicate with the device registry 940 to determine whether the received request is correctly associated with the IIoT machine 104, that is, with the device that issued the request. If the requesting device is found in the device registry 940 with the appropriate attributes, then at operation 1003 the JWT bearer token from the IIoT machine 104 can be passed from the edge manager 920 to the UAA service 610.

At operation 1004, the UAA service 610 can verify a token signature, for example by checking a certificate against records in the device registry 940. If the token signature is verified at the UAA service 610, then at operation 1005 the UAA service 610 can issue an OAuth2 bearer token to the edge manager 920. At operation 1006, the edge manager 920 can relay the token to the IIoT machine 104. At operation 1007, the IIoT machine 104 can use the received bearer token to make authenticated calls to the destination application 960, for example over two-way TLS through the edge manager 920.

Figure 11:
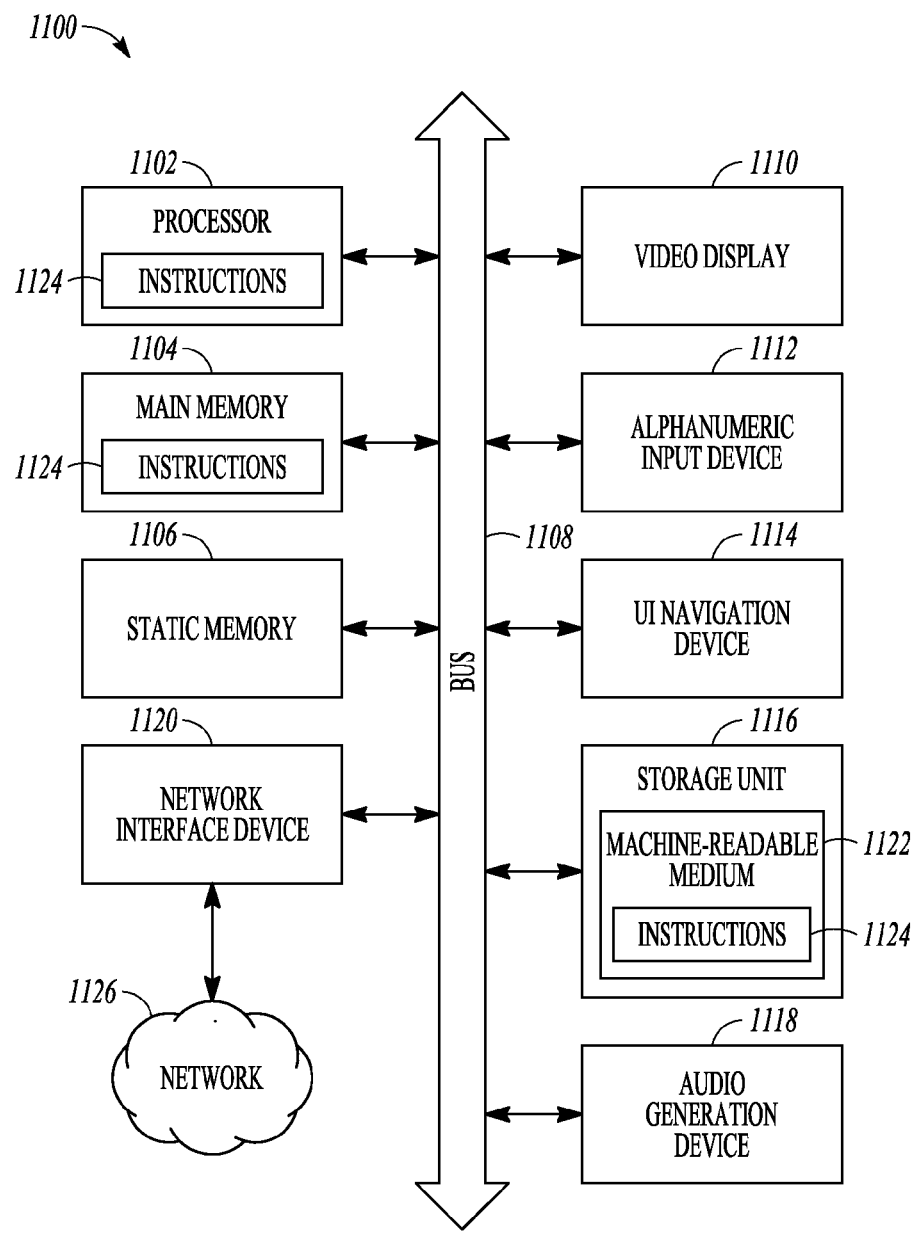
FIG. 11 illustrates a block diagram of a machine or device in the example form of a computer system within which instructions for causing a machine or device to perform any one or more of the methodologies discussed herein may be executed.

FIG. 11 is a block diagram of a machine or device in the example form of a computer system 1100 within which instructions for causing a machine or device to perform any one or more of the methodologies discussed herein may be executed. In alternative embodiments, the machine or device operates as a standalone device or may be connected (e.g., networked) to other machines or devices. In a networked deployment, the machine or device may operate in the capacity of a server or a client machine in a server-client network environment, or as a peer machine in a peer-to-peer (or distributed) network environment. The machine or device can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a graphics or video display unit 1110 (e.g., a liquid crystal display (LCD) or a cathode ray tube (CRT)). The computer system 1100 also includes an alphanumeric input device 1112 (e.g., a keyboard), a user interface (UI) navigation (or cursor control) device 1114 (e.g., a mouse), a storage unit (e.g., a disk drive unit) 1116, an audio or signal generation device 1118 (e.g., a speaker), and a network interface device 1120.

The storage unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media. The instructions 1124 may also reside, completely or at least partially, within the static memory 1106.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for selective gesture interaction using spatial volumes. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations or methods herein. This apparatus may be specially constructed for the required purposes, or it may include a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the present subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A method for negotiating machine access to a cloud-based application using an edge manager device; the method comprising:
    establishing, at an edge manager device in a cloud computing environment, a first client corresponding to a first application that is executed externally to the cloud computing environment, the first application configured to register identification information about one or more external devices with the edge manager device using the first client, to permit later data access to the edge manager device by the one or more external devices;
    using the edge manager device, providing a first request via a first network to an authorization service application to obtain client identification and client secret information for use by the first client;
    receiving the client identification and client secret information at the edge manager device from the authorization service application via the first network, wherein the client identification and client secret information are selected by the authorization service application to permit later data access to the edge manager device by the first client; and
    using the edge manager device, providing the client identification and client secret information to the first client via a second network.

2. The method of claim 1, further comprising receiving, at the edge manager device and from the first client via the third network, a request to pre-register a first external device with the edge manager device, the request including first device identification information for the first external device.

3. The method of claim 2, further comprising using the edge manager device, updating a cloud-based device registry database to include the first device identification information for the first external device.

4. The method of claim 3, further comprising receiving, at the edge manager device and via a third network, the first device identification information and a certificate signing request (CSR) from the first external device.

5. The method of claim 4, wherein the receiving the first device identification information and the CSR from the first external device includes receiving a JSON web token from the first external device.

6. The method of claim 4, wherein the receiving the first device identification information and the CSR from the first external device further includes receiving at least one of a MAC address, IP address, OS version, or BIOS version corresponding to the first external device.

7. The method of claim 4, further comprising:
    using the edge manager device, establishing credential data for use by the first external device to access a first cloud-based application; and
    using the edge manager device, providing the credential data to the first external device via the third network.

8. The method of claim 7, wherein the establishing credential data for use by the first external device includes, using the edge manager device, requesting device credential data from the authorization service application via the first network.

9. The method of claim 8, further comprising using the edge manager device, providing the CSR to a registration authority application via the first network and, in return, receiving a signed certificate at the edge manager device.

10. The method of claim 9, further comprising using the edge manager device, providing the signed certificate to the first external device via the third network.

11. The method of claim 8, further comprising receiving, at the edge manager device and in response to the requesting the device credential data, an OAuth2 token for use by the first external device to establish a secure data communication link between the first external device and the first cloud-based application.

12. The method of claim 11, further comprising using the edge manager device, providing the OAuth2 token to the first external device.

13. The method of claim 1, further comprising receiving, at the edge manager device and from the first client via the second network, one or more requests to pre-register a plurality of external devices with the edge manager device, the one or more requests including respective device identification information for each of the plurality of external devices; and using the edge manager device, adding the respective device information for each of plurality of external devices to a cloud-based device registry database.

14. The method of claim 13, further comprising:
receiving, at the edge manager device via a third network, a device enrollment request from a first external device of the plurality of external devices, the device enrollment request including first device identification information corresponding to the first external device; and
using the edge manager device, querying the cloud-based device registry database to determine whether the first external device is pre-registered with the edge manager device.

15. The method of claim 14, further comprising using the edge manager device to obtain, from the authorization service application, device-specific identification and secret information for use by the first external device to access a cloud-based application service.

16. The method of claim 13, further comprising:
receiving, at the edge manager device via a third network, a device enrollment request from a first external device other than the plurality of external devices, the device enrollment request including first device identification information corresponding to the first external device; and
using the edge manager device, returning a denial of access indication to the first external device when the first device identification information does not correspond to the device identification information for any one of the plurality of external devices.

17. A method for administering machine access to a cloud service application, the method comprising:
using an authenticated application outside of a cloud environment, assigning first identification information for use by a first machine, including providing the first identification information to the first machine and to a cloud-based enrollment service application via separate networks;
receiving, via a network and at the enrollment service application, an enrollment request from the first machine, the enrollment request including the assigned first identification information corresponding to the first machine; and
determining, using the enrollment service application, whether the received first identification information corresponds to valid identification information based on a comparison of the received first identification information and previously-known valid identification information, wherein when the received first identification information is determined to correspond to the previously-known valid identification information, returning a certificate from the enrollment service application to the first machine, the certificate for use by the first machine to obtain data access to one or more cloud-based applications.

18. The method of claim 17, further comprising enrolling the authenticated application with a cloud service, including using the enrollment service application to provide credential data to the authenticated application, the credential data configured to permit the authenticated application data access to one or more cloud-based applications.

19. The method of claim 17, further comprising using the first machine, generating a certificate signing request (CSR) and providing the CSR and the first identification information from the first machine to the cloud-based enrollment service application via a network.

20. A method for using a device-based authentication certificate to obtain data access to a cloud-based destination application, the method comprising:
using an edge manager device, receiving, via a first network, a first token and first data access request from a first machine wherein the first machine is outside of the cloud, the edge manager device configured to administer data access for the first machine to one or more cloud-based applications;
using the edge manager device, querying a device registry database via a second network to determine whether an authentication certificate associated with the first token is previously known to correspond with the first machine;
receiving an indication via the second network whether the authentication certificate is previously known to correspond with the first machine and, when the authentication certificate is previously known to correspond with the first machine, using the edge manager device, providing the first token and information about the first machine from the edge manager device to a cloud-based authorization service application via a third network;
using the cloud-based authorization service application, verifying the first token against a cloud-based device registry, generating an OAuth2 token for use by the first machine when the first token is verified, and providing the OAuth2 token to the edge manager device via the third network; and
using the edge manager device, providing the OAuth2 token to the first machine via the first network.

* * * * *